United States Patent
Oburu et al.

(10) Patent No.: US 11,693,634 B2
(45) Date of Patent: Jul. 4, 2023

(54) BUILDING SEGMENT-SPECIFIC EXECUTABLE PROGRAM CODE FOR MODELING OUTPUTS

(71) Applicant: EQUIFAX INC., Atlanta, GA (US)

(72) Inventors: Peter Oburu, Acworth, GA (US);
Martin O'Connor, Atlanta, GA (US);
Thomas Aliff, Peachtree Corners, GA (US)

(73) Assignee: EQUIFAX INC., Atlanta, GA (US)

( * ) Notice: Subject to any disclaimer, the term of this patent is extended or adjusted under 35 U.S.C. 154(b) by 0 days.

(21) Appl. No.: 17/341,329

(22) Filed: Jun. 7, 2021

(65) Prior Publication Data

US 2021/0294580 A1 Sep. 23, 2021

Related U.S. Application Data

(63) Continuation of application No. 16/500,244, filed as application No. PCT/US2018/060689 on Nov. 13, 2018, now Pat. No. 11,055,071.

(Continued)

(51) Int. Cl.
*G06F 9/445* (2018.01)
*G06F 8/35* (2018.01)
(Continued)

(52) U.S. Cl.
CPC .............. *G06F 8/35* (2013.01); *G06F 3/0484* (2013.01); *G06F 8/20* (2013.01); *G06F 8/36* (2013.01)

(58) Field of Classification Search
CPC . G06F 8/35; G06F 3/0484; G06F 8/20; G06F 8/36
(Continued)

(56) References Cited

U.S. PATENT DOCUMENTS 8,880,446 B2 11/2014 Wellman et al.
8,997,038 B2 3/2015 Bozek et al.
(Continued)

FOREIGN PATENT DOCUMENTS

WO 2013109860 A1 7/2013
WO 2017053347 A1 3/2017

OTHER PUBLICATIONS

U.S. Appl. No. 16/500,244, "Non-Final Office Action", dated Nov. 12, 2020, 11 pages.

(Continued)

*Primary Examiner* — Chuck O Kendall
(74) *Attorney, Agent, or Firm* — Kilpatrick Townsend & Stockton LLP

(57) ABSTRACT

Certain aspects involve building segment-specific executable program code. In one example, a code-building service can execute segmentation logic that assigns different target entity records to different segments based on differences between sets of attribute values among the target entity records. The code-building service can select, for each segment, a set of data assets that is specific to the assigned segment and a set of source code portions that is specific to the selected data assets. The code-building service can order each set of the source code portions based on an identified modeling output type for the target entity records. The code-building service can generate, from the ordered source code portions, a set of program code referencing the selected subset of the data assets. For instance, the generated program code, if executed, can generate and transmit different modeling outputs for different target entity records.

20 Claims, 6 Drawing Sheets

Related U.S. Application Data

(60) Provisional application No. 62/585,229, filed on Nov. 13, 2017.

(51) Int. Cl.
　　*G06F 3/0484*　　(2022.01)
　　*G06F 8/20*　　(2018.01)
　　*G06F 8/36*　　(2018.01)

(58) Field of Classification Search
　　USPC .................................................. 717/168–178
　　See application file for complete search history.

(56) References Cited

U.S. PATENT DOCUMENTS

| | | | |
|---|---|---|---|
| 9,189,579 | B2 | 11/2015 | Brideson et al. |
| 9,286,329 | B2 | 3/2016 | Svarovsky et al. |
| 11,055,071 | B2 * | 7/2021 | Oburu .................. G06Q 10/103 |
| 2005/0256695 | A1 | 11/2005 | Oh |
| 2007/0033567 | A1 | 2/2007 | Carlson et al. |
| 2012/0239613 | A1 | 9/2012 | Danciu et al. |
| 2013/0104132 | A1 | 4/2013 | Chen et al. |
| 2014/0250419 | A1 | 9/2014 | Ivmark et al. |

OTHER PUBLICATIONS

U.S. Appl. No. 16/500,244, "Notice of Allowance", dated Mar. 12, 2021, 8 pages.
International Application No. PCT/US2018/060689, "International Preliminary Report on Patentability", dated May 28, 2020, 7 pages.
International Application No. PCT/US2018/060689, "International Search Report and Written Opinion", dated Mar. 4, 2019, 12 pages.
European Patent Application No. 18876346.0, "Extended European Search Report", dated Jul. 20, 2021, 10 pages.
European Patent Application No. 18876346.0, "Office Action", dated Jan. 24, 2022, 6 pages.

* cited by examiner

BUILDING SEGMENT-SPECIFIC EXECUTABLE PROGRAM CODE FOR MODELING OUTPUTS

CROSS-REFERENCES TO RELATED APPLICATIONS

This application is a continuation of and claims priority to and the benefit of U.S. patent application Ser. No. 16/500,244, filed Oct. 2, 2019, entitled BUILDING SEGMENT-SPECIFIC EXECUTABLE PROGRAM CODE FOR MODELING OUTPUTS, which is the National Stage of International Application No. PCT/US2018/060689, filed Nov. 13, 2018, entitled BUILDING SEGMENT-SPECIFIC EXECUTABLE PROGRAM CODE FOR MODELING OUTPUTS, which claims the benefit of priority of U.S. Provisional Application No. 62/585,229, filed on Nov. 13, 2017. The entire disclosures of all these applications (including all attached documents) are incorporated by reference in their entireties for all purposes.

TECHNICAL FIELD

This disclosure relates generally to software development systems that create and manage program code for automated modeling systems, and more particularly to building segment-specific executable program code for implementing modeling operations.

BACKGROUND

Software development systems and other code-generating tools can be used to generate source code for automated modeling algorithms. Automated modeling algorithms are executed by computing systems to generate outputs based on certain models. Examples of these modeling outputs include predictive outputs, such as risk indicators associated with an entity, and analytical outputs, such as an analysis of an entity's financial health. Models can be implemented by building source code that executes various operations corresponding to the model. For example, an automated modeling algorithm executes a set of code portions and thereby generates modeling outputs involving circumstances similar to predictor variables or other aspects of a model embodied in the code.

SUMMARY

Certain aspects involve building segment-specific executable program code for implementing modeling operations. In one example, a code-building service can execute segmentation logic that assigns different target entity records to different segments based on differences between sets of attribute values among the target entity records. The code-building service can select, for each assigned segment, a set of data assets that is specific to the assigned segment and a set of source code portions that is specific to the selected data assets. The code-building service can order each set of the source code portions based on an identified modeling output type for the target entity records. The code-building service can generate, from the ordered source code portions, a set of program code referencing the selected subset of the data assets. For instance, the generated program code, if executed, can generate and transmit different modeling outputs for different target entity records.

DETAILED DESCRIPTION

Figure 1:
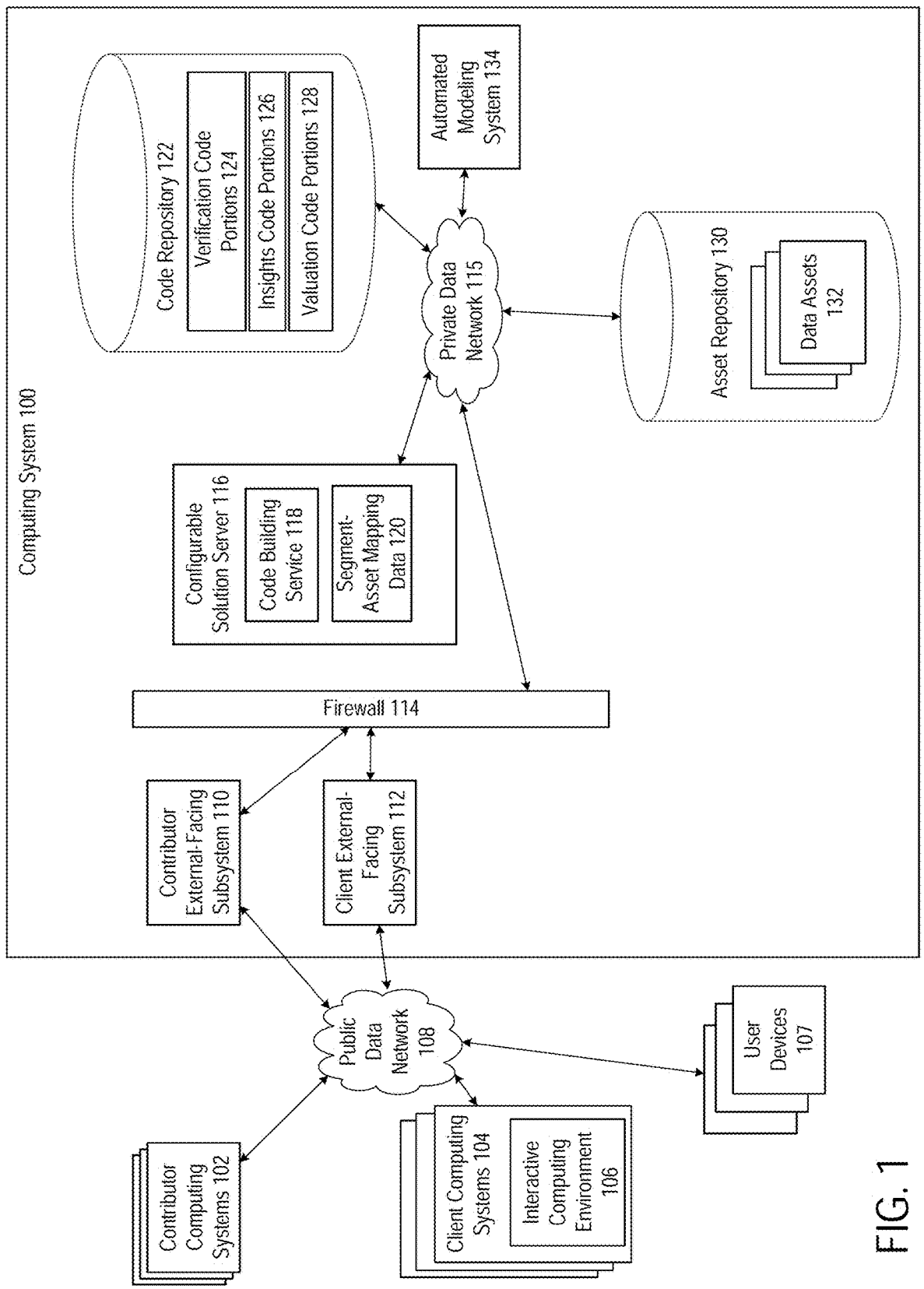
FIG. 1 depicts an example of a computing environment for building segment-specific executable program code for implementing modeling operations, according to certain aspects of the present disclosure.

As described herein, certain embodiments provide improvements to development environments by, for example, providing customizing the creation of program code to certain data segments that are suitable for certain tasks or code portions. For instance, implementing software modeling requires building sets of executable program code within a development environment. Existing software development tools may require manually designing such a specific software modeling solution. The software modeling solution is then tested with respect to different data segments, and manually modified if undesirable performance (e.g., incorrect modeling output) is observed with respect to certain segments. Thus, using computer-implemented modeling operations presents users with difficulties with regard to developing program code in a software development environment.

Aspects and examples are disclosed for building executable program code for implementing computational solutions specifically configured for certain data segments. In some aspects, a configurable solution server can be used to create and manage different sets of computer program code that implement modeling solutions. The configurable solution server communicates with various client computing systems via a data network to obtain data that guides a segment-specific process for building the program code. The data includes, for example, one or more sets of target entity data and one or more modeling output types. Target entity data can include data identifying various attributes of an individual or other entity, where the attributes are used as predictor variables in a model. Examples of modeling output types can include a predictive output indicating a risk associated with an entity, a predicted behavior of an entity, analytics describing certain trends associated with the entity's behavior and history, etc. The configurable solution server can host an integrated development environment or other software development tool that automatically builds program code specific to a segment for implementing the desired modeling solution.

For example, the development environment can include segmentation logic that groups different target entities into different segments. A particular segment can include a group of entities that share certain attributes and attribute values (or ranges of attribute values). The configurable solution server can determine, for a particular segment, that certain types of data assets are suitable for a modeling algorithm that computes the specified modeling output type. Data assets can be data sources having entity-related data obtained from multiple contributor computing systems via a data network. The configurable solution server can select, from a code repository, certain code portions that perform modeling operations specific to the identified data assets. The configurable solution server can automatically generate executable program code from the selected set of code portions. Executing the program code with input data from the selected data assets can generate one or more modeling outputs having the specified modeling output type.

In some aspects, the configurable solutions systems described herein can more effectively generate a segment-specific set of executable program code for a modeling solution as compared to existing software development tools. For instance, as noted above, existing development environments require manual modification of lines or blocks of source code or other program code (e.g., within a code editor) after testing the code's implementation of a desired modeling operation. By contrast, a configurable solution server described herein can use the results of segmentation logic to build the program for a modeling solution, thereby customizing the program code to a particular segment and desired modeling output. In some aspects, the configurable solution server allows relevant data assets and code portions to be selected, rearranged, or otherwise modified via interactive elements of a graphical interface. Various aspects, provide an intuitive manner of building executable program code for implementing a modeling solution by allowing users to more quickly access and manipulate relevant data assets and program code, thereby improving the efficient functioning of a computing environment for developing or executing the program code.

Example of Operating Environment for Code-Building Service

Referring now to the drawings, FIG. 1 is a block diagram depicting an example of an operating environment in which a code-building service is used for building segment-specific executable program code for generating predictive or analytics outputs. FIG. 1 depicts examples of hardware components of a computing system 100, according to some aspects. In some aspects, the computing system 100 is a specialized computing system that includes one or more devices or functions that may be used for automatically developing executable program code. For example, a computing system 100 can be a development computing system or otherwise include software development functionality. In additional or alternative aspects, the computing system 100 is a specialized computing system that may be used for processing large amounts of data using a large number of computer processing cycles. For example, a computing system 100 can be an automated modeling system, a data analytics computing system, or other computing system that includes functionality for generating one or more of predictive outputs, analytical outputs, outputs used for access control within online computing environments, etc.

The numbers of devices depicted in FIG. 1 are provided for illustrative purposes. Different numbers of devices may be used. For example, while certain devices or systems are shown as single devices in FIG. 1, multiple devices may instead be used to implement these devices or systems.

The computing system 100 can communicate with various other computing systems, such as contributor computing systems 102 and client computing systems 104. For example, contributor computing systems 102 and client computing systems 104 may send data to the configurable solution server 116 to be processed or may send signals to the configurable solution server 116 that control or otherwise influence different aspects of the computing system 100 or the data it is processing.

In some aspects, the client computing systems 104 may interact with end user devices 107 via one or more public data networks 108 to facilitate access to various functions of interactive computing environments 106 that are hosted or otherwise provided by the client computing systems 104 and that are performed via interactions received the end user devices 107. For instance, an individual can access, with an end user device 107 such as a laptop or smart phone, an interactive computing environment 106 hosted by a client computing system 104. In a simplified example, an electronic transaction between the end user device 107 and the client computing system 104 can include, for example, the end user device 107 being used to submit a loan application or other digital application to the client computing system 104 via the interactive computing environment 106. The client computing system 104 can communicate with the computing system 100 to obtain analytics or other data related to the transaction (e.g., a recommendation to approve the loan and an interest rate).

In some aspects, an interactive computing environment 106 implemented through a client computing system 104 can be used to provide access to various online functions. As a simplified example, a website or other interactive computing environment provided by a financial institution can include electronic functions for obtaining one or more financial services, such as loan application and management tools, credit card application and transaction management workflows, electronic fund transfers, etc. An end user device 107 can be used to request access to the interactive computing environment 106 provided by the client computing system 104, which can selectively grant or deny access to various electronic functions. Based on the request, the client computing system 104 can collect data associated with the user of the end user device 107 and communicate with the automated modeling system 134 to generate an analytical or predictive output with respect to the user or end user device 107. The computing system 100 can transmit the analytical or predictive output to the client computing system 104. Based on the analytical or predictive output, the client computing system 104 can determine whether to grant the access request of the end user device 107 with respect to certain features of the interactive computing environment 106.

The contributor computing systems 102 and client computing systems 104 may interact, via one or more public data networks 108, with various external-facing subsystems of the computing system 100. The computing system 100 can also include a contributor external-facing subsystem 110 and a client external-facing subsystem 112. Each external-facing subsystem includes one or more computing devices that provide a physical or logical subnetwork (sometimes referred to as a "demilitarized zone" or a "perimeter network") that expose certain online functions of the computing system 100 to an untrusted network, such as the Internet or another public data network 108. In some aspects, these external-facing subsystems can be implemented as edge nodes, which provide an interface between the public data network 108 and a cluster computing system, such as a Hadoop cluster used by the computing system 100.

Each external-facing subsystem is communicatively coupled, via a firewall device 114, to one or more computing devices forming a private data network 115. The firewall device 114, which can include one or more devices, creates a secured part of the computing system 100 that includes various devices in communication via the private data network 115. In some aspects, by using the private data network 115, the computing system 100 can house the asset repository 130 in an isolated network (i.e., the private data network 115) that has no direct accessibility via the Internet or another public data network 108.

Each contributor computing system 102 may include one or more third-party devices (e.g., computing devices or groups of computing devices), such as individual servers or groups of servers operating in a distributed manner. A contributor computing system 102 can include any computing device or group of computing devices operated by an online merchant, an e-commerce system, an employer, a payroll system, a human-resource management system, an insurance provider system, a healthcare provider system, a government data-provider system, etc. The contributor computing system 102 can include one or more server devices. The one or more server devices can include, or can otherwise access, one or more non-transitory computer-readable media. The contributor computing system 102 can further include one or more processing devices that are capable of storing, formatting, and transmitting, to a computing system 100, various data associated with individuals or other entities. Examples of this data include, but are not limited to, income data, employment data, property data, credit-related data, telecommunications data, etc. The computing system 100 can store at least some of this received data as trended data, such as time-series data organized on a month-by-month basis or other suitable interval of time.

Each client computing system 104 may include one or more third-party devices, such as individual servers or groups of servers operating in a distributed manner. A client computing system 104 can include any computing device or group of computing devices operated by a seller, lender, or other provider of products or services. The client computing system 104 can include one or more server devices. The one or more server devices can include or can otherwise access one or more non-transitory computer-readable media. The client computing system 104 can also execute an interactive computing environment. The interactive computing environment 106 can include executable instructions stored in one or more non-transitory computer-readable media. The client computing system 104 can further include one or more processing devices that are capable of executing the interactive computing environment 106 to perform operations described herein. In some aspects, the interactive computing environment 106 can provide an interface (e.g., a website, web server, or other server) to facilitate electronic transactions involving a user of an end user device 107. The interactive computing environment 106 may transmit data to and receive data from the end user device 107 to enable a transaction. A end user device 107 can include any computing device or other communication device operated by a consumer, a buyer, or other user.

Each communication within the computing system 100 may occur over one or more data networks, such as a public data network 108, a private data network 115, or some combination thereof. A data network may include one or more of a variety of different types of networks, including a wireless network, a wired network, or a combination of a wired and wireless network. Examples of suitable networks include the Internet, a personal area network, a local area network, a wide area network, or a wireless local area network. A wireless network may include a wireless interface or combination of wireless interfaces. A wired network may include a wired interface. The wired or wireless networks may be implemented using routers, access points, bridges, gateways, or the like, to connect devices in the data network.

A data network may include network computers, sensors, databases, or other devices that may transmit or otherwise provide data to computing system 100. For example, a data network may include local area network devices, such as routers, hubs, switches, or other computer networking devices. The data networks depicted in FIG. 1 can be incorporated entirely within (or can include) an intranet, an extranet, or a combination thereof. In one example, communications between two or more systems or devices can be achieved by a secure communications protocol, such as secure Hypertext Transfer Protocol ("HTTPS") communications that use secure sockets layer ("SSL") or transport layer security. In addition, data or transactional details communicated among the various computing devices may be encrypted. For example, data may be encrypted in transit and at rest.

The computing system 100 can include one or more configurable solution servers 116. The configurable solution server 116 may be a specialized computer or other machine that processes the data received within the computing system 100. The configurable solution server 116 may include one or more other systems. For example, the configurable solution server 116 may include a database system for accessing the network-attached storage unit, a communications grid, or both. A communications grid may be a grid-based computing system for processing large amounts of data.

The configurable solution server 116 can include one or more processing devices that execute program code, such as a code-building service 118. The program code is stored on a non-transitory computer-readable medium. The code-building service 118 can execute one or more processes for building segment-specific executable program code for generating predictive or analytics outputs. For example, the executable program code can include one or more modeling algorithms. The configurable solution server 116 can deploy the executable program code to an automated modeling system 134, which is used to generate analytical or predictive data to be provided to client computing systems 104.

The configurable solution server 116 can also store (or otherwise have access to) a set of segment-asset mapping data 120. The segment-asset mapping data 120 can link data assets to segments. For instance, the segment-asset mapping data 120 can be a data structure in which a data object (e.g., a row of a table) includes a first data element (e.g., a first column) corresponding to one or more segments and another element (e.g., a second column) corresponding to one or more data assets. The values of these data elements identify associations between certain data assets and certain segments identified by the code-building service 118. As described in further detail with respect to FIGS. 3 and 4, the code-building service 118 can select data assets for a particular segment based on the segment-asset mapping data 120. The code-building service 118 can generate executable program code from code portions corresponding to the data assets that have been selected for a particular segment. In this manner, the code-building service 118 can generate program code implementing a model, where the model is specific to a specific segment due to the program code being generated based on a segment-specific selection of data assets.

An automated modeling system 134 can include one or more processing devices configured to execute program code that has been generated by the configurable solution server 116. Examples of automated modeling systems 134 include a mainframe computer, a grid computing system, or other computing system that executes an automated modeling algorithm. An automated modeling algorithm can include machine-learning models with learned relationships between independent variables and the response variable. In some aspects, the automated modeling system 134 is a computing device (or set of computing devices) separate from the configurable solution server 116, as depicted in FIG. 1. In additional or alternative aspects, the automated modeling system 134 and the configurable solution server 116 are the same computing device (or set of computing devices).

In some aspects, the computing system 100 can execute one or more modules stored in a non-transitory computer-readable medium, such as a web server module and a web services module. For example, a web server module can be executed by a suitable processing device to provide one or more web pages or other interfaces to a client computing system 104. The web pages or other interfaces can include content provided by the web services module. The web services module can generate this content by obtaining data from an automated modeling system 134, which includes one or more processing devices that execute one or more modeling algorithms using information retrieved from the asset repository 130.

The computing system 100 may also include one or more network-attached storage units on which various repositories, databases, or other structures are stored. Examples of these data structures are the code repository 122 and the asset repository 130. Network-attached storage units may store a variety of different types of data organized in a variety of different ways and from a variety of different sources. For example, the network-attached storage unit may include storage other than primary storage located within configurable solution server 116 that is directly accessible by processors located therein. In some aspects, the network-attached storage unit may include secondary, tertiary, or auxiliary storage, such as large hard drives, servers, virtual memory, among other types. Storage devices may include portable or non-portable storage devices, optical storage devices, and various other mediums capable of storing and containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as compact disk or digital versatile disk, flash memory, memory or memory devices.

The code repository 122 can include various different types of preexisting code portions. In some aspects, these code portions can be developed specifically for the data in different types of data assets from the asset repository 130. The code repository 122 can store any suitable code portions usable with data assets from the asset repository 130. Examples of code portions include, but are not limited to, one or more verification code portions 124, insights code portions 126, valuation code portions 128, etc. An example of a verification code portion 124 is a set of executable program code that performs one or more functions with respect to verification of identity, employment, income, access control, etc. An example of a valuation code portion 128 is a set of executable program code that performs one or more functions with respect to computing one or more values to be assigned to an attribute that can be used in other code portions (e.g., pricing data).

The asset repository 130 can store different data assets 132. A data asset 132 can include information about entities, transactions involving entities, or both. The data in the data assets 132 can be received by a configurable solution server 116 from contributor computing systems 102, generated by the configurable solution server 116 based on communications with contributor computing systems 102, or some combination thereof. The data in the data assets 132 can be stored in, for example, a database or other suitable data source. Suitable data sources can include, for example, secure and credentialed databases or other data structures managed by or otherwise accessible by the code-building service 118.

In some aspects, one or more of the data assets 132 can store consumer identification data. Consumer identification data can include any information that can be used to uniquely identify an individual or other entity. In some aspects, consumer identification data can include information that can be used on its own to identify an individual or entity. Non-limiting examples of such consumer identification data include one or more of a legal name, a company name, a social security number, a credit card number, a date of birth, an e-mail address, etc. In other aspects, consumer identification data can include information that can be used in combination with other information to identify an individual or entity. Non-limiting examples of such consumer identification data include a street address or other geographical location, employment data, etc.

The asset repository 130 can store any type of account data, transaction data, or both. The asset repository 130 can include internal databases or other data sources that are stored at or otherwise accessible via the private data network 115. Non-limiting examples of data stored in the data assets 132 include tradeline data, employment data, income data, tax data, asset data (e.g., property records or verified data regarding other assets possessed by a client), data from service providers (e.g., cable television companies, telecommunications operators, and utility providers), and other types of consumer information.

In some aspects, the computing system 100 can implement one or more procedures to secure communications between the computing system 100 and other client systems. Non-limiting examples of features provided to protect data and transmissions between the computing system 100 and other client systems include secure web pages, encryption, firewall protection, network behavior analysis, intrusion detection, etc. In some aspects, transmissions with client systems can be encrypted using public key cryptography algorithms using a minimum key size of 115 bits. In additional or alternative aspects, website pages or other data can be delivered through HTTPS, secure file-transfer protocol ("SFTP"), or other secure server communications protocols. In additional or alternative aspects, electronic communications can be transmitted using SSL technology or other suitable secure protocols. Extended Validation SSL certificates can be utilized to clearly identify a website's organization identity. In another non-limiting example, physical, electronic, and procedural measures can be utilized to safeguard data from unauthorized access and disclosure.

The computing system 100 can communicate with one or more contributor computing systems 102 to obtain entity-related data (e.g., credit data, property data, income data, etc.) to be stored in the asset repository 130. In some aspects, a contributor external-facing subsystem 110 can communicate with a contributor computing system 102 via a public data network 108, such as the Internet. The contributor external-facing subsystem 110 can establish a secure communication channel, such as an SFTP connection, over the public data network 108 and with the contributor computing system 102. In some aspects, the secure communication channel can be automatically established on a periodic basis (e.g., each week, each bi-week, etc.). In additional or alternative aspects, the secure communication channel can be established by one or more of the computing systems in response to a command received via a user interface. The contributor external-facing subsystem 110 can receive the entity-related data via the secure communication channel. The contributor external-facing subsystem 110 can transmit, via the firewall device 114, the entity-related data to one or more processing devices in the computing system 100 for storage in the asset repository 130.

In some aspects, the client external-facing subsystem 112 can communicate with a client computing system 104 via a public data network 108, such as the Internet. The client external-facing subsystem 112 can establish a secure communication channel (e.g., an SFTP connection, an HTTP connection, etc.) over the public data network 108 and with the client computing system 104. In some aspects, the secure communication channel can be automatically established on a periodic basis (e.g., each week, each bi-week, etc.). In additional or alternative aspects, the secure communication channel can be established by one or more of the computing systems in response to a command received via a web interface that is provided from the computing system 100 (e.g., using the client external-facing subsystem 112) to the client computing system 104. The client external-facing subsystem 112 can receive one or more queries (e.g., requests for analytics regarding a particular entity or transaction) via the secure communication channel. The client external-facing subsystem 112 can transmit the query to the automated modeling system 134 via the firewall device 114. The automated modeling system 134 can service the query and generate predictive outputs, analytical outputs, or both. The client external-facing subsystem 112 can transmit the results of the query to the client computing system 104 via the firewall device 114.

Examples of Code Building Operations

The configurable solution server 116 can execute one or more processes that create sets of executable program code and thereby implement various different modeling solutions. The computing system 100 can use flexible configurations of different analytical solutions that are applied to different sets of data assets. For example, the configurable solution server 116 can build different modeling algorithms for different segments using different combinations of algorithm components and data assets. For each algorithm component, the configurable solution server 116 can identify and select multiple data assets and code portions that are appropriate for a given segment of target entities (e.g., applicants, lenders, etc.). By sequencing certain code portions and using certain sets of data assets, the configurable solution server 116 can develop algorithms for different segmentation schemes.

Figure 2:
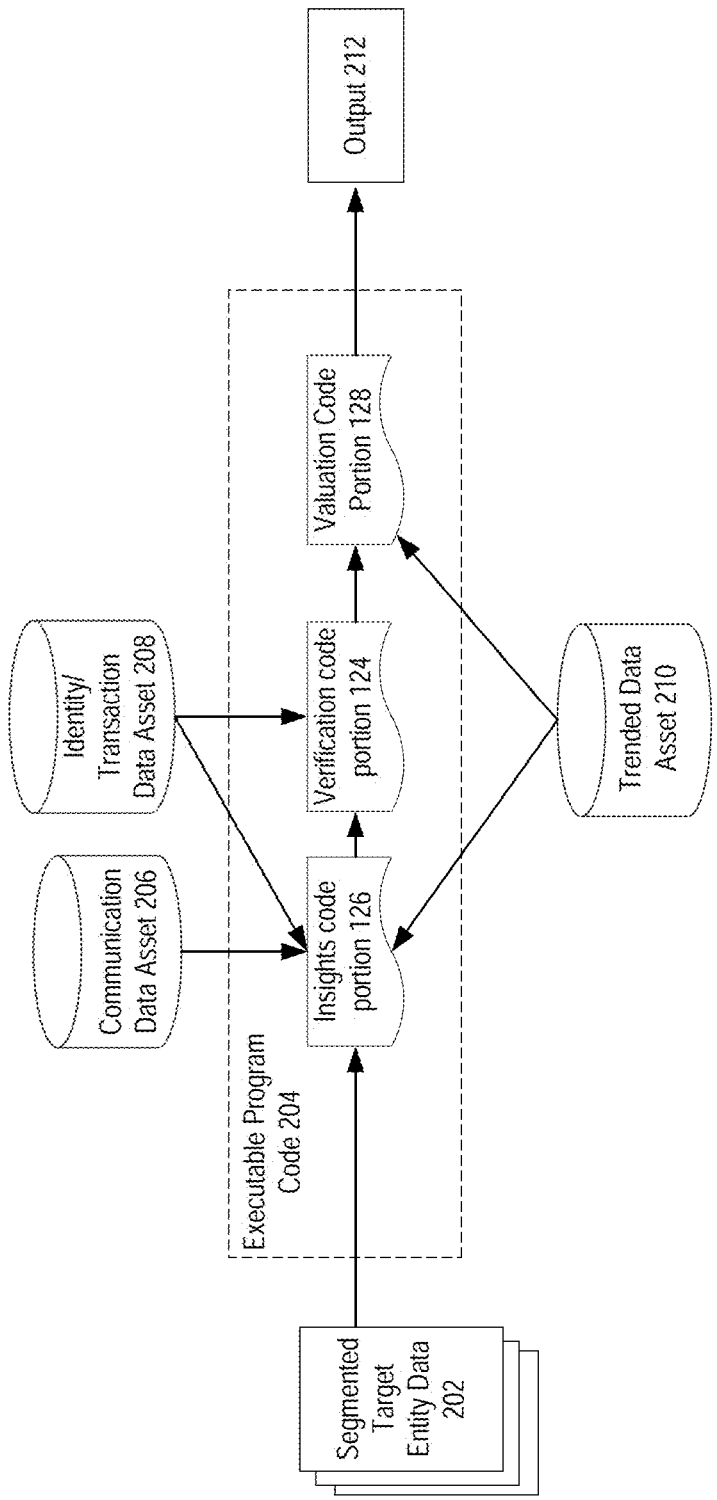
FIG. 2 depicts an example of a set of executable program code that has been generated with the computing environment of FIG. 1 to implement a segment-specific modeling operation, according to certain aspects of the present disclosure.

FIG. 2 depicts an example of a set of executable program code 204 that has been generated with the computing system 100 to implement a segment-specific modeling operation, according to certain aspects of the present disclosure. This example of a set of executable program code 204 could be generated to implement a segment-specific solution to a particular scenario (e.g., a risk assessment for a particular target entity with respect to a given transaction). In this example, segmented target entity data 202 is provided to a set of executable program code 204 that implements a particular modeling algorithm. For instance, the segmented target entity data 202 could include electronic requests from a type of user or device within a particular segment to access certain features of interactive computing environments. Examples of requests to access certain features of interactive computing environments include querying one or more datasets controlled by a secure system within the private data network, requesting approval of electronic loan applications, obtaining access to certain features of software applications within an interactive computing environment, etc. The segment can be a set of applicants having a certain combination of attributes that cause the applicants (i.e., the target entities) to be grouped together for analytical or other processing purposes in the application of the executable program code 204.

The set of executable program code 204 can be configured to use data from one or more data assets to generate one or more outputs 212. For instance, in the example depicted in FIG. 2, the configurable solution server 116 has generated executable program code 204 that references a communication data asset 206 including data that describes users or devices involved in communications over telecommunication networks, an identity/transaction data asset 208 that can include data regarding electronic transactions involving certain entities (e.g., credit data), and a trended data asset 210 that can include time-series data organized on a month-by-month basis or other suitable interval of time. Examples of outputs include control messages generated based on risk indicators (e.g., a message to prevent a certain device or user from accessing one or more functions of an online computing environment, predictive output messages (e.g., risk indicators), analytical output messages (e.g., decisions or recommendation), etc.

Figure 3:
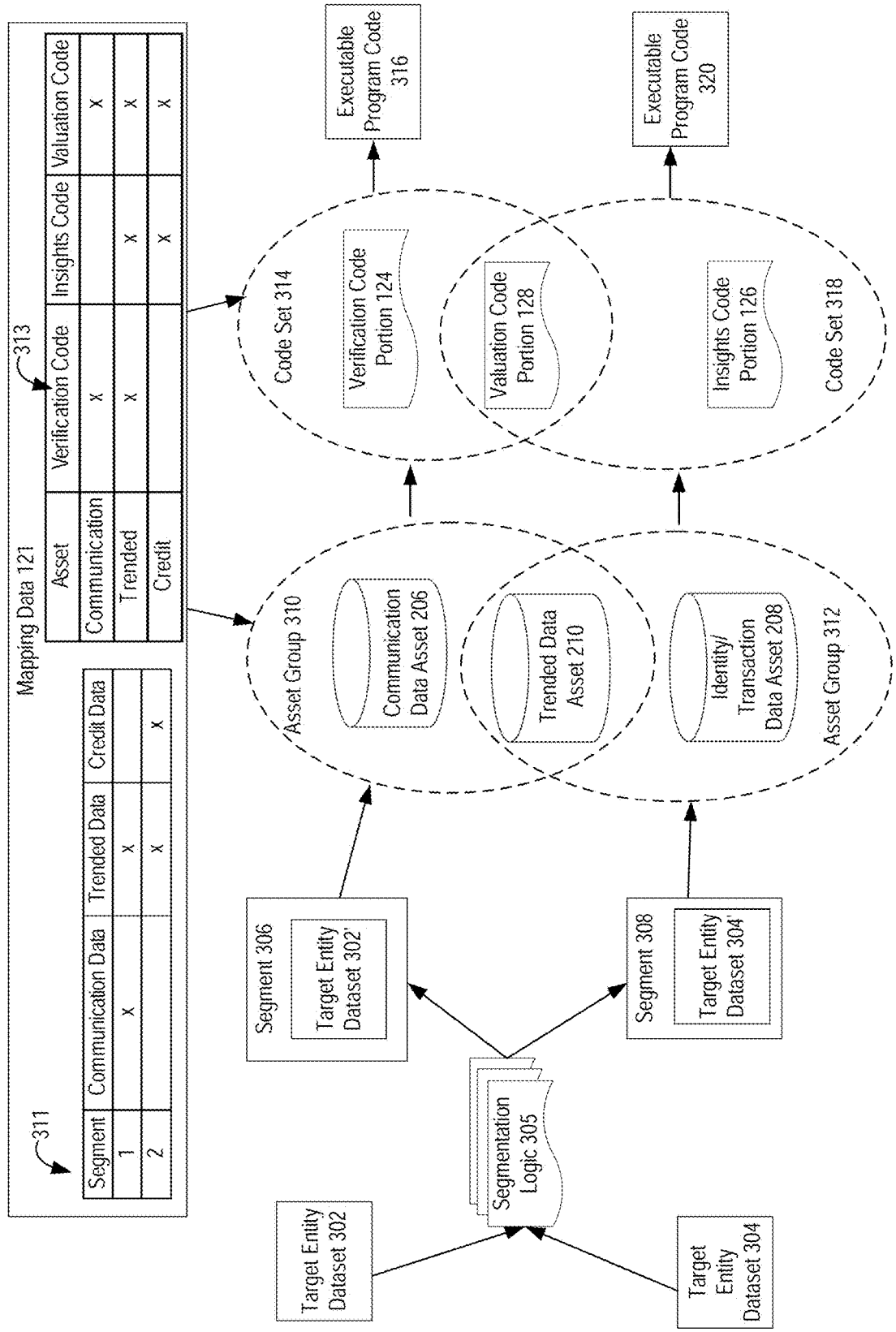
FIG. 3 depicts an example of building a set of executable program code using an asset repository and code repository from the computing environment of FIG. 1, according to certain aspects of the present disclosure.

The configurable solution server 116 can select certain data assets that correspond to a particular segment of the target entity data, as described in further detail with respect to FIG. 3. A given data asset can be used with multiple source code portions. For instance, in FIG. 2, the identity/transaction data asset 208 is referenced by both the insights code portion 126 and the verification code portion 124, and the trended data asset 210 is referenced by both the insights code portion 126 and the valuation code portion 128.

The set of executable program code 204 is built from a set of code portions from the code repository 122. For instance, in the example depicted in FIG. 2, an insights code portion 126, a verification code portion 124, and a valuation code portion 128 have been selected from the code repository 122. These code portions are selected by the configurable solution server 116 based on, for example, the segment for the target entity data, the data assets corresponding to the segment, the desired modeling output, or some combination thereof. The configurable solution server 116 can determine a desired sequence of operations corresponding to the three code portions. For example, the executable program code 204 can use an output of the insights code portion 126 as an input to the verification code portion 124 (e.g., to verify the income or employment of a loan applicant) and can use an output of the verification code portion 124 as an input to the valuation code portion 128 (e.g., to compute an interest rate for the loan applicant whose income or employment has been verified). The sequence of operations can be determined based on, for example, the desired modeling output (e.g., a funding decision for a loan application), the particular segment to which the target entity data is assigned, or some combination thereof.

In some aspects, an output 212 generated by using the executable program code 204 can be included in (or used to generated) a message that the computing system 100 transmits to a client computing system 104. An example of the message is a control signal or other data communication that is configured to cause the client computing system 104 to selectively grant or deny access to one or more features of an interactive computing environment. The client computing system 104 can use the message or output 212 to determine whether to grant access to one or more functions of an interactive computing environment 106. For instance, if the client computing system 104 determines, from the output 212, that a level of risk associated with a user accessing the interactive computing environment 106 is too high, the client computing system 104 can deny the access by the user to the interactive computing environment 106. Conversely, if the client computing system 104 determines that the level of risk associated with the user is acceptable, the client computing system 104 can grant the access to the interactive computing environment 106 by the user and the user would be able to utilize the various functions provided by the interactive computing environment 106. For example, with the granted access, the user can utilize the end user device 107 to access web pages or other user interfaces provided by the client computing system 104 to query data, submit online digital applications, operate electronic tools, or perform various other operations within the interactive computing environment 106 hosted by the client computing system 104.

FIG. 3 depicts an example of a data flow within the code-building service 118. For illustrative purposes, FIG. 3 depicts a simplified example involving two segments, three data assets, and three code portions. But any suitable number of segments, data assets, and code portions can be used to build segment-specific program code for implementing a model.

In this simplified example, the code-building service 118 can receive target entity data. For instance, the code-building service 118 can receive a first target entity dataset 302 and a second target entity dataset 304. Each target entity dataset can include data describing one or more entities (e.g., lenders, loan applicants, a population of potential applicants, etc.). In some aspects, the computing system 100 receives the target entity datasets 302 and 304 from one or more client computing systems 104 along with an instruction to generate executable code for a model specific to one or more segments of the target entity datasets 302 and 304. In additional or alternative aspects, the computing system 100 receives, from one or more client computing systems 104, a first input identifying one or more of the target entity dataset 302 and 304 and a second input representing an instruction to generate executable code for a model specific to segments of the target entity dataset. For instance, the first input could include a query having certain query parameters (e.g., names, social security numbers, etc.). The computing system 100 can match the query parameters to attributes of certain target entity datasets stored in the asset repository 130 or another suitable non-transitory computer-readable medium. The computing system 100 can retrieve a matching target entity dataset by matching the query parameters to attributes of the target entity dataset.

The code-building service 118 can execute segmentation logic 305 that assigns different target entity datasets to different segments. In the example depicted in FIG. 3, the code-building service 118 executes segmentation logic 305 that assigns the first target entity dataset 302 to a first segment 306 and assigns the second target entity dataset 304 to a second segment 308. In the example depicted in FIG. 3, a target entity dataset 302' assigned to segment 306 includes or is a copy of the target entity dataset 302, and a target entity dataset 304' assigned to segment 308 includes or is a copy of the target entity dataset 304. The segmentation logic 305 can include, for example, a statistical analysis or other analysis based on the attribute values of a particular target entity dataset (e.g., attributes of an individual described in a loan application).

Executing the segmentation logic 305 can allow the code-building service 118 to identify one or more data assets to be used for analyzing various target entity datasets. Different data assets may be more appropriate for certain segments. For example, if a segment includes individuals in a low income bracket and a low age demographic, those individuals may be less likely to have a lengthy credit history or a history of property ownership. Thus, a model may not be able to compute useful information about those users based on data assets such as property data and trended credit data (e.g., 48-month credit histories). Other types of data assets, such as telecommunications data and utility provider data, may be more suitable for modeling behaviors or characteristics of users in these segments. In additional or alternative aspects, different data assets can be selected based on the likelihood of the data asset having data relevant to the target entity data. For instance, the code-building service 118 can select a data asset with payday lending data if a particular target entity dataset for individuals is assigned to a segment for "sub-prime" entities and can select a data asset with property ownership data if a particular target entity dataset for individuals is assigned to a segment for "prime" entities.

The code-building service 118 can select different subsets of data assets based on different segments to which target entity data is assigned. For instance, the code-building service 118 can select a first asset group 310, which could include data assets such as communication data and trended data, for analyzing target entity data assigned to the first segment 306. In some aspects, the code-building service 118 can select the first asset group 310 by accessing a table 311 in the segment-asset mapping data 120 that indicates, for the first segment 306, that a communication data asset 206 and a trended data asset 210 have been identified as providing useful modeling information. The code-building service 118 can select a second asset group 312, which could include data assets such as the trended data asset 210 and an identity/transaction data asset 208, for analyzing target entity data assigned to the second segment 308. The code-building service 118 can select the second asset group 312 by accessing a table 313 in the segment-asset mapping data 120 that indicates, for the second segment 308, that communication data and trended data have been identified as providing useful modeling information.

In additional or alternative aspects, the segment-asset mapping data 120 can include more detailed information about the data assets, which can be used by the code-building service 118 to select certain data assets for a certain segment. For instance, to select a particular data asset for inclusion in a subset of data assets specific to an assigned segment identified by the segmentation logic, the code-building service 118 can access the segment-asset mapping data 120 that links certain segments to certain data assets. The code-building service 118 can identify, from the segment-asset mapping data, a data asset that includes an attribute that is also included in the assigned segment. The code-building service 118 can verify that the data asset identified from the segment-asset mapping data includes a threshold amount of data required for a specified modeling operation. A threshold amount of data required for a specified modeling operation can be an amount of data required to obtain a desired level of accuracy, precision, or both within the modeling results. In some aspects, a threshold amount of data is specified via one or more user inputs received via a graphical interface. In additional or alternative aspects, a particular modeling operation is specified via one or more user inputs received via a graphical interface, and the code-building service 118 can determine, by accessing data identifying threshold amounts of modeling data for different modeling operations, the threshold amount of data required for the specified modeling operation.

In one example, the segment-asset mapping data 120 can include a list of possible attributes that could be included in target entity data (e.g., "income level," "education levels," etc.). The segment-asset mapping data 120 could also include, for each attribute, possible attribute values or ranges of attribute values (e.g., "income level=$50K-$100K, $100K-$300K, . . . "). The segment-asset mapping data 120 can indicate whether each data asset includes certain attributes and has a sufficient amount of data for each desired attribute value or range of attribute values (e.g., a sufficient number of records to model the effect of an income level between $50,000 and $100,00). If a particular segment has a certain attribute and attribute value, the code-building service 118 can determine, from the mapping data, that a particular data asset is useful for modeling algorithms involving the segment. A particular data asset may be useful for modeling algorithms involving the segment because, for example, the data asset includes a corresponding attribute and a sufficient amount of data for the corresponding attribute. Additionally or alternatively, if a particular segment has a certain attribute and attribute value, the code-building service 118 can determine, from the mapping data, that a particular data asset is not useful for modeling algorithms involving the segment. A particular data asset may not be useful for modeling algorithms involving the segment because, for example, the data asset lacks a corresponding attribute, a sufficient amount of data for the corresponding attribute, or both.

The code-building service 118 can flexibly build different sets of executable program code 204 corresponding to different models. For instance, the code-building service 118 can be used to generate a first set of executable program code 316 from a first code set 314 having certain code portions and the corresponding set of data assets. In the simplified example of FIG. 3, the segment-asset mapping data 120 indicates that the verification code portion 124 and the valuation code portion 128 are available for the first asset group 310. For instance, each of the verification code portion 124 and the valuation code portion 128 may include code blocks or other functions that use data from the first asset group 310 as inputs. This code-building service 118 can select this first code set 314 for building executable program code 316 that implements a risk assessment model. The executable program code 316 is specific to the first segment 306 at least because the code set 314 is selected based on the data asset group 310, which is mapped to the first segment 306. The segment-asset mapping data 120 also indicates that the insights code portion 126 and the valuation code portion 128 are available for the second asset group 312. For instance, each of the insights code portion 126 and the valuation code portion 128 may include code blocks or other functions that use data from the second asset group 312 as inputs. The code-building service 118 can select this second code set 318 of code portions for building executable program code 320 that implements a risk assessment model specific to the second segment 308.

Although FIG. 3 depicts one set of segmentation logic, other implementations are possible. In some aspects, additional segmentation logic may be applied as the program code is being built. For instance, if the first set of code portions is used to build a set of program code, the outputs from the insights code portion 126 could be further segmented using additional segmentation logic. The results of the segmentation logic could result in certain additional code portions being included or omitted when generating the set of executable program code 204.

Figure 4:
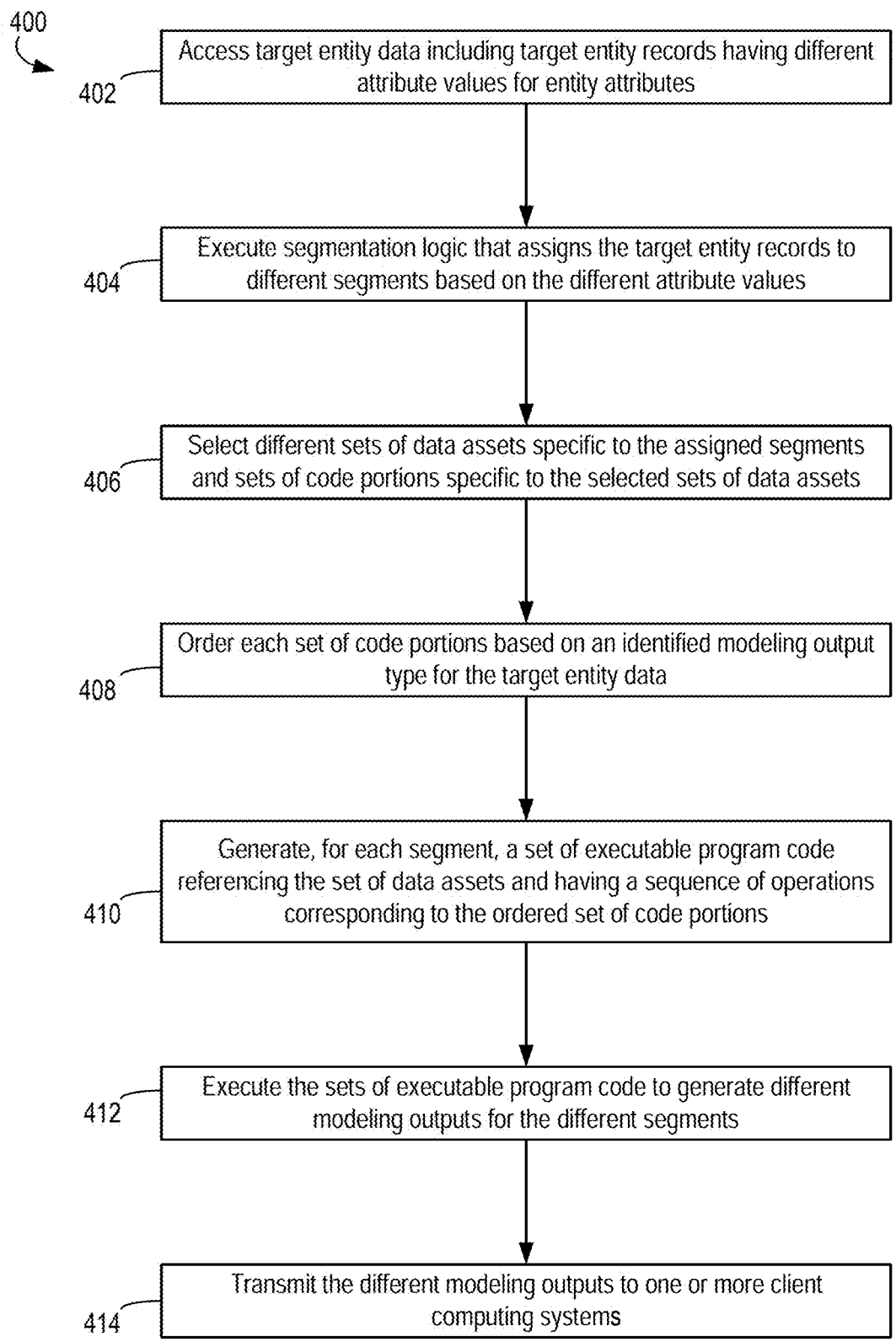
FIG. 4 depicts an example of a process for building segment-specific executable program code for implementing modeling operations, according to certain aspects of the present disclosure.

FIG. 4 is a flow chart illustrating an example of a process 400 for building segment-specific executable program code for automated modeling operations. For illustrative purposes, the process 400 is described with reference to implementations described above with respect to one or more examples described herein. Other implementations, however, are possible. In some aspects, the steps in FIG. 4 may be implemented in program code that is executed by one or more computing devices, such as the configurable solution server 116 depicted in FIG. 1. In some aspects of the present disclosure, one or more operations shown in FIG. 4 may be omitted or performed in a different order. Similarly, additional operations not shown in FIG. 4 may be performed.

At block 402, the process 400 involves accessing target entity records having different attribute values for entity attributes. The configurable solution server 116 can execute the code-building service 118 and thereby perform operations for implementing block 402. For example, the code-building service 118 can access, from a non-transitory computer-readable medium, a set of target entity records. In some aspects, the computing system 100 can receive the target entity records from one or more client computing systems 104 via the client external-facing subsystem 112. The received target entity records can be stored in a non-transitory computer-readable medium for retrieval at block 402.

At block 404, the process 400 involves executing segmentation logic that assigns the target entity records to different segments based on the different attribute values. The configurable solution server 116 can execute the code-building service 118 and thereby perform operations for implementing block 404. For example, the code-building service 118 can retrieve segmentation logic from a non-transitory computer-readable medium. The segmentation logic can include any number of segmentation schemes (e.g., hundreds of schemes, thousands of schemes, etc.). Executing the segmentation logic can automatically assess the target entity records and determine appropriate segments for the target entity records, as discussed above with respect to FIG. 3.

At block 406, the process 400 involves selecting (i) different sets of data assets specific to the assigned segments and (ii) sets of code portions specific to the selected sets of data assets. The configurable solution server 116 can execute the code-building service 118 and thereby perform operations for implementing block 406. For example, the code-building service 118 can retrieve, from a non-transitory computer-readable medium, the segment-asset mapping data 120 that associates certain data assets with certain segments. The code-building service 118 can determine, from the mapping, that certain data assets should be included or excluded for an analysis of target entity data assigned to a particular segment, as described above with respect to FIG. 3. The code-building service 118 can also identify, from the segment-asset mapping data 120, certain code portions that are designed for analyzing the selected data assets. An example of identifying code portions is described above with respect to FIG. 3. The code-building service 118 can retrieve copies of the identified code portions from the code repository 122.

At block 408, the process 400 involves ordering each set of code portions based on an identified modeling output type. The configurable solution server 116 can execute the code-building service 118 and thereby perform operations for implementing block 408

The modeling output type can be identified based on user input received by the computing system 100 from a client computing system 104. For example, the code-building service 118 can generate a configuration interface and provide the configuration interface to a client computing system 104 via a data network. The client computing system 104 can display the configuration interface and receive, via the configuration interface, one or more user inputs identifying a particular modeling output type (e.g., a loan approval recommendation, a recommended interest rate for a loan, etc.). The client computing system 104 can transmit the identified modeling output type to the computing system 100. The code-building service 118 can use the modeling output type to order the code portions and thereby generate executable program code 204 for a model that provides the specified modeling output type.

In some aspects, ordering a particular subset of the source code portions comprises configuring a set of program code, which is ultimately generated from the particular subset of the source code portions, to execute a first code portion from the selected subset of the source code portions prior to executing a second code portion from the selected subset of the source code portions. For instance, a generated set of program code can include a sequence of the first and second code portions in which an output of the first code portion is provided as an input to the second code portion. In additional or alternative aspects, the code-building service 118 can order the code portions to facilitate processing efficiency. This could involve ordering a particular subset of the source code portions by configuring a set of program code, which is generated from the particular subset of the source code portions, to control an execution of certain code portions based on the output of other code portions.

For instance, a first execution of a set of generated program code could involve a first code portion generating a first interim output, and a second execution of that set of generated program code could involve the first code portion generating a second interim output. In the first execution that involves the first interim output being generated, a second code portion within the set of generated program code could also be executed. In the second execution that involves the second interim output being generated, the second code portion within the set of generated program code could be prevented from executing. For instance, an "if, then" statement or other conditional statement could be included in the set of generated program code, where a function of the second code portion is called if the first interim output is encountered, and the function of the second code portion is not called if the second interim output is encountered.

In a simplified example, a particular modeling output type, such as a recommended interest rate for a loan, may involve at least two phases: a first phase that determines an applicant's eligibility for a loan and a second phase that determines a potential interest rate for the applicant. A first code portion (e.g., verification code) can implement the first phase, and a second code portion (e.g., pricing code) can implement the second phase. The code-building service 118 can access modeling data indicating that a determination of ineligibility (i.e., an interim output generated by executing the verification code) would obviate the need to compute a potential interest rate, since no loan will be offered to an ineligible applicant. Based on this modeling data, the code-building service 118 can determine that the verification code should be sequenced before the pricing code, since the algorithm for determining the recommended interest rate should terminate if the applicant is ineligible for the loan. In this manner, the code-building service 118 can generate a set of program code having an order of code elements that efficiently utilizes the processing resources of a computing system that executes the segment-specific program code.

At block 410, the process 400 involves generating, for each segment, a set of executable program code 204 referencing the set of data assets and having a sequence of operations corresponding to the ordered set of code portions. The configurable solution server 116 can execute the code-building service 118 and thereby perform operations for implementing block 410. For example, the code-building service 118 can copy the selected code portions into a new file. The code-building service 118 can update the copied code to specify relationships between the code portions (e.g., input/output relationships). The code-building service 118 can also update the copied code to include references to relevant data assets. In some aspects, the code-building service 118 can compile, assemble, or otherwise transform the generated code into a form suitable for use by the automated modeling system 134.

In some aspects, the code-building service 118 can execute one or more machine-learning algorithms to train a specific model that is implemented via the generated program code. For example, automated modeling algorithms (e.g., algorithms using modeling techniques such as logistic regression, neural networks, support vector machines, etc.) are trained using large volumes of training data. The training data is grouped into predictor variables that are provided as inputs to the automated modeling system. The automated modeling system can use this analysis to learn from and make predictions regarding similar electronic transactions or circumstances. For example, the automated modeling system uses the predictor variables to learn how to generate predictive outputs involving transactions or other circumstances similar to the predictor variables from the training data.

Such an automated modeling algorithm can be implemented using the program code that is generated at block 410. The code-building service 118 can obtain training data for this automated modeling algorithm by retrieving relevant datasets from the data assets for a particular segment. For instance, if a particular segment is mapped to certain data assets, then the code-building service 118 can retrieve relevant data from those data assets. The retrieved relevant data can be entity-related data with attributes corresponding to the segment and attribute values (or ranges of attribute values) corresponding to the attribute values for the segment (or target entity data assigned to the segment). The code-building service 118 can train the automated modeling algorithm using the retrieved training data. For instance, at block 410, the code-building service 118 can update the generated program code to reflect the results of the training (e.g., configuring the program code with certain coefficients for certain entity attributes, modifying the structure of a machine-learning model used by the program code, etc.).

At block 412, the process 400 involves executing the sets of executable program code 204 to generate different modeling outputs for the different segments. The configurable solution server 116 can deploy the executable program code 204 to the automated modeling system 134 by, for example, storing the executable program code 204 in a non-transitory computer-readable medium accessible to the automated modeling system 134. The automated modeling system 134 can execute the program code using the segmented target entity data 202 as input. Executing the program code can cause the automated modeling system 134 to generate the modeling outputs.

At block 414, the process 400 involves transmitting the different modeling outputs to one or more client computing systems. The automated modeling system 134 can provide the modeling outputs to the client external-facing subsystem 112 via the private data network 115. The client external-facing subsystem 112 can transmit the different modeling outputs to one or more client computing systems 104 via the public data network 108. In some aspects, one or more processing devices of the computing system 100 can update a graphical interface to include the modeling outputs and can transmit the updated graphical interface to the client computing system 104 (e.g., by updating a web page presented to the client computing system 104).

One or more operations described above with respect to FIGS. 1-4 can more efficiently generate, via a software development environment, executable program code that implements modeling algorithms for specific segments. Furthermore, customizing the program code to a particular segment can provide increased accuracy of the modeling outputs generated by the modeling algorithm.

In some aspects, the code-building service 118 can display configurable options for the segment-specific program code to an end user. For example, the code-building service 118 can generate a graphical interface that identifies the data assets to be used for a particular modeling solution, the code portions to be used in the modeling solution, and the order in which the code portions will be executed in the modeling solution. The code-building service 118 can provide this graphical interface, which is configured to display and manipulate asset-selection interface elements and code-selection interface elements, to one or more computing devices via a data network. For instance, the code-building service 118 can host an interactive computing environment that is accessible by client computing systems or other computing devices. Such a computing device can establish a session with the code-building service 118 for using the interactive computing environment. The code-building service 118 can provide, via the session, a graphical interface for configuring various code portions. The code-building service 118 can receive, via the graphical interface, inputs that manipulate one or more asset-selection interface elements, which can thereby control the selection of at least some of the data assets and code portions used to generate program code in the examples of FIGS. 2-4. The code-building service 118 can update the graphical interface in response to these inputs. For instance, the code-building service 118 can modify an arrangement of a set of code-selection interface elements that represent the selected subset of the source code portions. This arrangement can correspond to the ordering of the selected subset of the source code portions performed in the examples of FIGS. 2-4.

Figure 5:
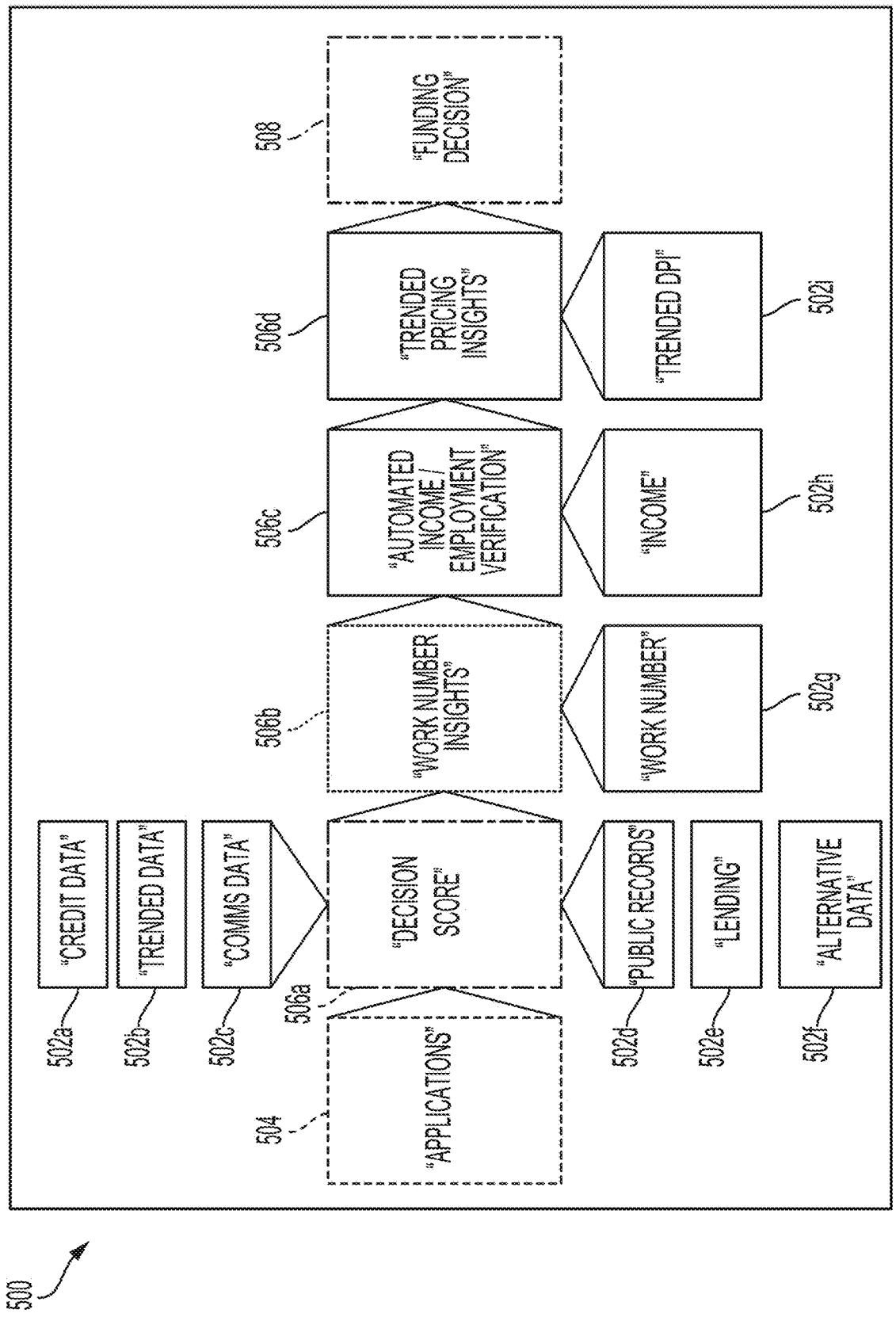
FIG. 5 depicts an example of a graphical interface for identifying data assets and code portions to be used for generating executable program code that implements a particular modeling solution, according to certain aspects of the present disclosure.

FIG. 5 depicts an example of such a graphical interface 500. In some aspects, the graphical interface 500 can be configured to receive user input that modifies the modeling solution prior to the code-building service 118 generating executable program code 204 that implements the modeling solution used to implement a task, which can be indicated by an output graphical element 508. For example, a client computing system 104 can receive inputs via the graphical interface 500. These inputs can modify one or more configurable options for the modeling solution. These options can include removing certain data assets from the modeling solution, adding certain data assets to the modeling solution, removing certain code portions from the modeling solution, adding certain code portions to the modeling solution, reordering code portions in the modeling solution, etc. In one example, moving, adding, or deleting one or more of the asset-selection interface elements 502a-i to the graphical interface 500 can modify which data assets are used in the modeling solution. In another example, moving, adding, or deleting one or more of the code-selection interface elements 506a-e and connecting one or more of the code-selection interface elements 506a-e to the application interface element 504 can modify which code portions are used in the modeling solution.

Inputs received via the graphical interface 500 can be used to modify the corresponding operations in the process 400. In one example, if an input to an asset-selection interface element changes the selection of data assets to be used in the modeling solution, the code-building service 118 can implement block 406 by selecting sets of code portions that are consistent with or otherwise correspond to the modified selection of data assets (e.g., adding code portions corresponding to added data assets, removing code portions corresponding to removed data assets, etc.). In another example, if an input to one or more code-selection interface elements changes the order in which the code portions are executed in the modeling solution, the code-building service 118 can implement block 408 by ordering the code portions in accordance with the input. For instance, block 408 can involve selecting an initial sequence for the code portions, displaying indicators of that initial sequence via the graphical interface 500, and modifying the sequence based on one or more user inputs received via the graphical interface 500.

In some aspects, providing the graphical interface 500 for interacting with the code-building service 118 can improve the efficiency, effectiveness, or both with which the computing system 100 operates. For instance, the asset-selection interface elements allow users to more quickly access stored assets and intuitively specify the role of these data assets with respect to program code that will be generated using the code-building service 118. Additionally or alternatively, the asset-selection interface elements allow users to more quickly access and manipulate interactions among different code portions from which a set of program code is built. By using one or more of the interface elements described herein in combination with the code-building service 118, users may avoid time-consuming operations with respect to, for example, selecting various assets or code segments, specifying relationships among assets and code segments, locating and correcting errors resulting from manually modifying source code via a text editor, etc.

Example of Computing Environment for Code-Building Service

Figure 6:
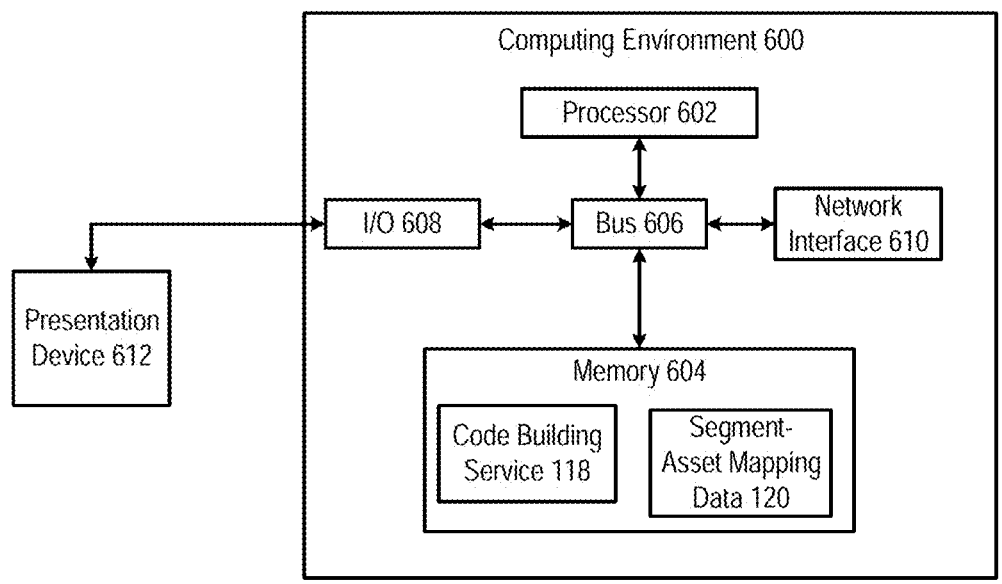
FIG. 6 is a block diagram depicting an example of a computing system for implementing certain aspects described in the present disclosure.

Any suitable computing system or group of computing systems can be used to perform the operations for building segment-specific executable program code 204. For example, FIG. 6 is a block diagram depicting an example of a computing environment 600 for implementing certain aspects described above with respect to FIGS. 1-5. The computing environment 600 can be used to implement one or more devices depicted in FIG. 1, such as a configurable solution server 116, an automated modeling system 134, or some combination thereof. The computing environment 600 can include various devices for communicating with other devices in the computing system 100, as described with respect to FIG. 1. The configurable solution server 116 can also include various devices for performing one or more code-building operations described above with respect to FIGS. 1-5.

The computing environment 600 can include a processor 602 that is communicatively coupled to a memory 604. The processor 602 executes computer-executable program code 204 stored in the memory 604, accesses information stored in the memory 604, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 602 include a microprocessor, an application-specific integrated circuit, a field-programmable gate array, or any other suitable processing device. The processor 602 can include any number of processing devices, including one. The processor 602 can include or communicate with a memory 604. The memory 604 stores program code that, when executed by the processor 602, causes the processor to perform the operations described in this disclosure.

The memory 604 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, ROM, RAM, an ASIC, magnetic storage, or any other medium from which a computer processor can read and execute program code. The program code may include processor-specific program code generated by a compiler or an interpreter from code written in any suitable computer-programming language. Examples of suitable programming language include Hadoop, C, C++, C#, Visual Basic, Java, Python, Perl, JavaScript, ActionScript, etc.

The computing environment 600 may also include a number of external or internal devices such as input or output devices. For example, the computing environment 600 is shown with an input/output interface 608 that can receive input from input devices or provide output to output devices. A bus 606 can also be included in the computing environment 600. The bus 606 can communicatively couple one or more components of the computing environment 600.

The computing environment 600 can execute program code that includes the code-building service 118. The program code for the code-building service 118 may be resident in any suitable computer-readable medium and may be executed on any suitable processing device. For example, as depicted in FIG. 6, the program code for the code-building service 118 can reside in the memory 604 at the computing environment 600. Executing the code-building service 118 can configure the processor 602 to perform the operations described herein.

In some aspects, the computing environment 600 can include one or more output devices. One example of an output device is the network interface device 610 depicted in FIG. 6. A network interface device 610 can include any device or group of devices suitable for establishing a wired or wireless data connection to one or more data networks described herein. Non-limiting examples of the network interface device 610 include an Ethernet network adapter, a modem, etc.

Another example of an output device is the presentation device 612 depicted in FIG. 6. A presentation device 612 can include any device or group of devices suitable for providing visual, auditory, or other suitable sensory output. Non-limiting examples of the presentation device 612 include a touchscreen, a monitor, a speaker, a separate mobile computing device, etc. In some aspects, the presentation device 612 can include a remote client-computing device that communicates with the computing environment 600 using one or more data networks described herein. In other aspects, the presentation device 612 can be omitted.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification that terms such as "processing," "computing," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

What is claimed is:

1. A computing system comprising:
an asset repository comprising data assets, wherein each data asset comprises a data structure storing entity data;
a code repository comprising source code portions; and
a server configured for:
accessing target entity data comprising a first target entity record with a first set of attribute values for entity attributes and a second target entity record with a second set of attribute values for the entity attributes,
assigning the first target entity record and the second target entity record to different segments based on differences between the first set of attribute values and the second set of attribute values,
for each assigned segment of the different segments:
selecting a subset of the data assets that is specific to the assigned segment,
selecting a subset of the source code portions that is specific to the selected subset of the data assets, and
generating, from the subset of the source code portions, a set of program code referencing the selected subset of the data assets,
generating, by executing each generated set of program code, different modeling outputs for the first target entity record and the second target entity record, and
transmitting the different modeling outputs to one or more client computing systems via a data network.

2. The computing system of claim 1, wherein the server is further configured for:
providing a graphical interface configured to display and manipulate asset-selection interface elements and code-selection interface elements;
receiving an input that manipulates an asset-selection interface element, wherein the subset of the data assets and the subset of the source code portions are selected based on a manipulation the asset-selection interface element; and
updating the graphical interface to modify an arrangement of a set of code-selection interface elements that represent the selected subset of the source code portions, wherein the modified arrangement corresponds to ordering of the selected subset of the source code portions.

3. The computing system of claim 1, wherein selecting subset of the data assets that is specific to the assigned segment comprises:

accessing segment-asset mapping data that links segments to the data assets;
identifying, from the segment-asset mapping data, a particular data asset that includes an attribute that is also included in the assigned segment;
verifying that the particular data asset identified from the segment-asset mapping data includes a threshold amount of data required for a specified modeling operation; and
adding the particular data asset to the subset of the data assets based on verifying that the particular data asset includes the threshold amount of data.

4. The computing system of claim 3, wherein selecting the subset of the source code portions that is specific to the selected subset of the data assets comprises:
determining, from the segment-asset mapping data, that a particular source code portion performs one or more operations that use data from the particular data asset as input; and
adding the particular source code portion to the subset of the source code portions.

5. The computing system of claim 1, wherein ordering a particular subset of the source code portions comprises configuring a set of program code generated from the particular subset of the source code portions to:
execute a first code portion from the selected subset of the source code portions; and
execute a second code portion from the selected subset of the source code portions subsequent to executing the first code portion.

6. The computing system of claim 1, wherein ordering a particular subset of the source code portions comprises configuring a set of program code generated from the particular subset of the source code portions to:
execute a first code portion, wherein a first execution of the set of program code involves the first code portion generating a first interim output, wherein a second execution of the set of program code involves the first code portion generating a second interim output;
execute, based on the first interim output being generated, a second code portion in the first execution of the set of program code; and
prevent, based on the second interim output being generated, the second code portion from being executed in the second execution of the set of program code.

7. The computing system of claim 1, wherein one or more of the different modeling outputs are configured to cause the one or more client computing systems to perform one or more of:
providing a user device with access to a function within an interactive computing environment; and
preventing the user device from accessing the function within the interactive computing environment.

8. A method in which one or more processing devices performs operations comprising:
accessing target entity data comprising a first target entity record with a first set of attribute values for entity attributes and a second target entity record with a second set of attribute values for the entity attributes;
assigning the first target entity record and the second target entity record to different segments based on differences between the first set of attribute values and the second set of attribute values; and
for each assigned segment of the different segments:
selecting, from an asset repository comprising data assets, a subset of the data assets that is specific to the assigned segment, selecting, from a code repository comprising source code portions, a subset of the source code portions that is specific to the selected subset of the data assets, and generating, from the subset of the source code portions, a set of program code referencing the selected subset of the data assets, wherein the set of program code is executable by a computing system for generating and transmitting different modeling outputs for the first target entity record and the second target entity record.

9. The method of claim 8, the operations further comprising:

generating, by executing each generated set of program code, the different modeling outputs for the first target entity record and the second target entity record; and transmitting the different modeling outputs to one or more client computing systems via a data network, wherein one or more of the different modeling outputs are configured to cause the one or more client computing systems to perform one or more of:
providing a user device with access to a function within an interactive computing environment, and
preventing the user device from accessing the function within the interactive computing environment.

10. The method of claim 8, the operations further comprising:

providing a graphical interface configured to display and manipulate asset-selection interface elements and code-selection interface elements;

receiving an input that manipulates an asset-selection interface element, wherein the subset of the data assets and the subset of the source code portions are selected based on a manipulation the asset-selection interface element; and updating the graphical interface to modify an arrangement of a set of code-selection interface elements that represent the selected subset of the source code portions, wherein the modified arrangement corresponds to ordering of the selected subset of the source code portions.

11. The method of claim 8, wherein selecting the subset of the data assets that is specific to the assigned segment comprises:

accessing segment-asset mapping data that links segments to the data assets;

identifying, from the segment-asset mapping data, a particular data asset that includes an attribute that is also included in the assigned segment;

verifying that the particular data asset identified from the segment-asset mapping data includes a threshold amount of data required for a specified modeling operation; and adding the particular data asset to the subset of the data assets based on verifying that the particular data asset includes the threshold amount of data.

12. The method of claim 11, wherein selecting the subset of the source code portions that is specific to the selected subset of the data assets comprises:

determining, from the segment-asset mapping data, that a particular source code portion performs one or more operations that use data from the particular data asset as input; and adding the particular source code portion to the subset of the source code portions.

13. The method of claim 8, wherein ordering a particular subset of the source code portions comprises configuring a set of program code generated from the particular subset of the source code portions to:

execute a first code portion from the selected subset of the source code portions; and execute a second code portion from the selected subset of the source code portions subsequent to executing the first code portion.

14. The method of claim 8, wherein ordering a particular subset of the source code portions comprises configuring a set of program code generated from the particular subset of the source code portions to:

execute a first code portion, wherein a first execution of the set of program code involves the first code portion generating a first interim output, wherein a second execution of the set of program code involves the first code portion generating a second interim output;

execute, based on the first interim output being generated, a second code portion in the first execution of the set of program code; and prevent, based on the second interim output being generated, the second code portion from being executed in the second execution of the set of program code.

15. A non-transitory computer-readable medium storing instructions that, when executed by one or more processing devices, performs operations comprising:

accessing target entity data comprising a first target entity record with a first set of attribute values for entity attributes and a second target entity record with a second set of attribute values for the entity attributes;

assigning the first target entity record and the second target entity record to different segments based on differences between the first set of attribute values and the second set of attribute values; and for each assigned segment of the different segments:
selecting, from an asset repository comprising data assets, a subset of the data assets that is specific to the assigned segment,
selecting, from a code repository comprising source code portions, a subset of the source code portions that is specific to the selected subset of the data assets, and
generating, from the subset of the source code portions, a set of program code referencing the selected subset of the data assets, wherein the set of program code is executable by a computing system for generating and transmitting different modeling outputs for the first target entity record and the second target entity record.

16. The non-transitory computer-readable medium of claim 15, the operations further comprising:

generating, by executing each generated set of program code, the different modeling outputs for the first target entity record and the second target entity record; and transmitting the different modeling outputs to one or more client computing systems via a data network, wherein one or more of the different modeling outputs are configured to cause the one or more client computing systems to perform one or more of:
providing a user device with access to a function within an interactive computing environment, and
preventing the user device from accessing the function within the interactive computing environment.

17. The non-transitory computer-readable medium of claim 15, the operations further comprising:

providing a graphical interface configured to display and manipulate asset-selection interface elements and code-selection interface elements;

receiving an input that manipulates an asset-selection interface element, wherein the subset of the data assets and the subset of the source code portions are selected based on a manipulation the asset-selection interface element; and updating the graphical interface to modify an arrangement of a set of code-selection interface elements that represent the selected subset of the source code portions, wherein the modified arrangement corresponds to ordering of the selected subset of the source code portions.

18. The non-transitory computer-readable medium of claim 15, wherein selecting the subset of the data assets that is specific to the assigned segment comprises:

accessing segment-asset mapping data that links segments to the data assets;

identifying, from the segment-asset mapping data, a particular data asset that includes an attribute that is also included in the assigned segment;

verifying that the particular data asset identified from the segment-asset mapping data includes a threshold amount of data required for a specified modeling operation; and adding the particular data asset to the subset of the data assets based on verifying that the particular data asset includes the threshold amount of data.

19. The non-transitory computer-readable medium of claim 18, wherein selecting the subset of the source code portions that is specific to the selected subset of the data assets comprises:

determining, from the segment-asset mapping data, that a particular source code portion performs one or more operations that use data from the particular data asset as input; and adding the particular source code portion to the subset of the source code portions.

20. The non-transitory computer-readable medium of claim 15, wherein ordering the selected subset of the source code portions comprises configuring the set of program code to:

execute a first code portion, wherein a first execution of the set of program code involves the first code portion generating a first interim output, wherein a second execution of the set of program code involves the first code portion generating a second interim output;

execute, based on the first interim output being generated, a second code portion in the first execution of the set of program code; and prevent, based on the second interim output being generated, the second code portion from being executed in the second execution of the set of program code.

* * * * *